United States Patent
Negishi et al.

(10) Patent No.: US 8,401,540 B2
(45) Date of Patent: Mar. 19, 2013

(54) MOBILE COMMUNICATION SYSTEM, CONTROL DEVICE THEREOF, MOBILE TERMINAL, AND DATABASE CONSTRUCTING METHOD

(75) Inventors: Kazuya Negishi, Fuchu (JP); Keiji Yamamoto, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 393 days.

(21) Appl. No.: 12/358,585

(22) Filed: Jan. 23, 2009

(65) Prior Publication Data

US 2009/0203378 A1    Aug. 13, 2009

(30) Foreign Application Priority Data

Jan. 24, 2008   (JP) .................. 2008-013775

(51) Int. Cl.
*H04W 4/00*    (2009.01)
*H04W 36/00*    (2009.01)

(52) U.S. Cl. ..................... 455/422.1; 455/436
(58) Field of Classification Search .......... 455/422.1
See application file for complete search history.

(56) References Cited

U.S. PATENT DOCUMENTS

| | | | | | |
|---|---|---|---|---|---|
| 5,613,205 | A | * | 3/1997 | Dufour ................. | 455/440 |
| 6,392,649 | B1 | * | 5/2002 | Rising, III ............. | 345/440 |
| 2007/0249347 | A1 | * | 10/2007 | Saifullah et al. ........ | 455/436 |
| 2009/0069015 | A1 | | 3/2009 | Yamamoto et al. | |
| 2010/0317390 | A1 | * | 12/2010 | Rekimoto ............... | 455/511 |

FOREIGN PATENT DOCUMENTS

| | | |
|---|---|---|
| CN | 1852591 | 10/2006 |
| EP | 1753259 A1 * | 1/2006 |
| EP | 1 753 259 A1 | 2/2007 |
| GB | 2372404 A * | 2/2001 |
| GB | 2 372 404 A | 8/2002 |
| JP | 11-211768 | 8/1999 |
| KR | 100771155 B1 | 10/2007 |

OTHER PUBLICATIONS

Combined Search and Examination Report issued by the United Kingdom Intellectual Property Office on May 21, 2009, for United Kingdom Patent Application No. GB0901090.1.
Notification of the First Office Action in Chinese Application No. 200910003369.7, mailed Mar. 9, 2011.

* cited by examiner

*Primary Examiner* — Charles Appiah
*Assistant Examiner* — Natasha Cosme
(74) *Attorney, Agent, or Firm* — Finnegan, Henderson, Farabow, Garrett & Dunner, L.L.P.

(57) ABSTRACT

A mobile communication system comprises base stations, a mobile terminal and a control device. The mobile terminal comprises a report unit reports a reception power of a radio wave from a current station and a next station to the control device for each base station switch processing. The control device comprises a calculation unit calculates a first distance and a second distance. The first distance is the distance between the current station and the mobile terminal. The second distance is the distance between the next station and the mobile terminal. The control device comprises a database stores distance data between the base stations. The control device comprises an update unit updates the distance data by a minimum value of a sum of the first and the second distances.

6 Claims, 6 Drawing Sheets

| Base station | Output power | Base station 1 | Base station 2 | Base station 3 | Base station 4 | Base station 5 | |
|---|---|---|---|---|---|---|---|
| | | Distance | Distance | Distance | Distance | Distance | .... |
| CS1 | 400 mW | CS2 | CS3 | CS4 | CS5 | – | .... |
| | | 200m | 240m | 240m | 180m | – | .... |
| CS2 | 400 mW | CS3 | CS1 | CS6 | CS5 | CS7 | .... |
| | | 250m | 200m | 220m | 210m | 80m | .... |
| : | : | : | : | : | : | : | |
| CSn | 500 mW | CSM | CSL | CSK | – | – | .... |
| | | 210m | 190m | 220m | – | – | .... |

MOBILE COMMUNICATION SYSTEM, CONTROL DEVICE THEREOF, MOBILE TERMINAL, AND DATABASE CONSTRUCTING METHOD

CROSS-REFERENCE TO RELATED APPLICATIONS

This application is based upon and claims the benefit of priority from prior Japanese Patent Application No. 2008-013775, filed Jan. 24, 2008, the entire contents of which are incorporated herein by reference.

BACKGROUND OF THE INVENTION

1. Field of the Invention

The invention relates to a mobile communication system, a control device thereof, a mobile terminal, and a database constructing method. The invention relates to an improvement of a mobile communication system forming radio zones, for example, in a macro cell system. Particularly, the invention relates to switch processing the base stations as the mobile terminal moves among the radio zones. For example, the switch processing is so called handover or handoff.

2. Description of the Related Art

Systems forming an area of a mobile communication system are broadly classified into macro cell systems and micro cell systems. A representative of the former is a so-called cellular phone system; the radius of each radio area is several km. Meanwhile, for example, a personal handy-phone system (PHS), as it is called in Japan, adopts the latter; its area radius is very small and is several hundred meters at maximum.

In the micro cell system, the number of base stations increases or decreases frequently in response to a change in the communication demand of a region. Accordingly, there is no real plan as regards the base stations (base station location design), as regards installation location and location relationship with adjacent base stations, and base stations are always installed spontaneously. The resulting interference among areas needs to be dealt with by each base station in order to avoid cross talk.

To perform handoff, a system of this kind has to switch areas in accordance with a re-calling operation from a mobile terminal. In the micro cell system, handoffs occur so frequently that the system is weak in high-speed movement of the mobile terminal, which has resulted in the need for increased resolution. However, under the present circumstances, the performance of the handoff depends heavily on the ability of the mobile terminal. Enhancing the high-speed moving performance increases the cost of the mobile terminal, which results in a heavy burden on the user, and thus requires resolving.

According to a technique which is disclosed in Jpn. Pat. Appln. KOKAI Publication No. 11-211768, a mobile communication system may recognize an area in which a radio wave from a base station (referred to as a cell station) has a low intensity; however a system in which base station location design was not carried out cannot receive the full benefit of its effect.

BRIEF SUMMARY OF THE INVENTION

As mentioned above, in the existing mobile communication system, the mobile terminal cost must be increased in order to improve the handoff performance. Therefore, a technical innovation capable of improving the high-speed moving performance at a low cost, while especially suppressing the cost of a mobile terminal, has been desired.

An object of the invention is to provide a mobile communication system, a control device thereof, a database construction method, and a mobile terminal configured to improve the high-speed moving performance at a low cost. More specifically, an object of the present invention is to provide a mobile communication system configured to recognize distances and adjacent relationships between base stations so as to improve the handoff performance on the system side.

According to an aspect of the present invention, there is provided a mobile communication system comprising: a plurality of base stations which individually form radio zones; a mobile terminal which performs switch processing the base stations as the mobile terminal moves among the radio zones; and a control device which is configured to communicate with both the base stations and the mobile terminal, wherein the mobile terminal comprises: a report unit which reports a reception power of a radio wave from a current station that is a base station before the switch processing and a reception power of a radio wave from a next station that is a base station after the switch processing to the control device for each switch processing; and the control device comprises: a calculation unit which calculates a first distance that is a distance between the current station and the mobile terminal on the basis of a difference between a reported value of the reception power of the radio wave from the current station and an output power of the current station, and calculates a second distance that is a distance between the next station and the mobile terminal on the basis of a difference between a reported value of the reception power of the radio wave from the next station and an output power of the next station; a database which stores distance data between the base stations in a database form; and an update unit which updates the distance data by a minimum value of a sum of the first and the second distances.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
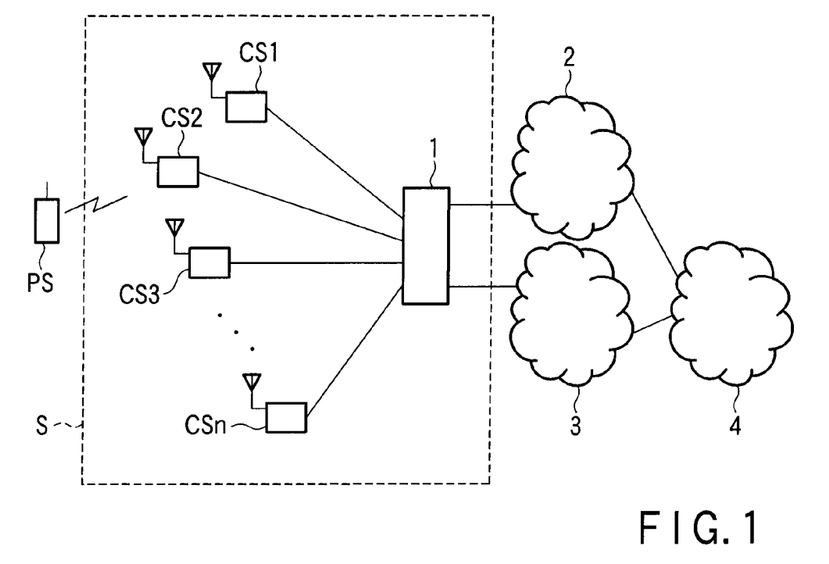
FIG. 1 is an exemplary system view depicting an embodiment of a mobile communication system of the invention.

FIG. 1 is a system view depicting an embodiment of a mobile communication system of the invention. A mobile communication system S of FIG. 1 includes base stations CS1-CSn (CS) and a control device 1. The control device accommodates the base stations CS via cable channels. Each base station CS1-CSn forms a radio zone (area), and the mobile terminal PS is accommodated by radio in any of the base station CS in any radio zone. With movement among radio zones, the mobile terminal PS performs handoff to sequentially switch base stations CSs of connection destinations. It is needless to say that the number of mobile terminals PS is not limited to one, as illustrated in FIG. 1.

The mobile terminal PS is a cellular phone. In addition, the mobile terminal PS may be connected to a personal computer or a personal digital assistant (PDA) and have a function of transmitting and receiving multimedia data. The mobile terminal PS may be a cellular phone, having high functionality, referred to as a smartphone. The smartphone has functions of a mobile terminal or a PHS terminal and a PDA.

The control device 1 is connected to an Internet Protocol (IP) network 2 and a public network 3. The IP network 2 and the public network 3 are further connected to the Internet 4. The IP network 2 is a connectionless type network transmitting IP packets. The public network 3 is, for example, an Integrated Service Digital Network (ISDN).

Since ISDN is a connection type network designed to transmit time-division data, and the ISDN and the IP network 2 are networks differing from each other, the control device 1 has a function of mutually converting Protocols of each network 2, 3. Thereby, the mobile terminal PS may communicate with the networks 2, 3 and the Internet 4. Devices of this kind include a so-called gateway.

Figure 2:
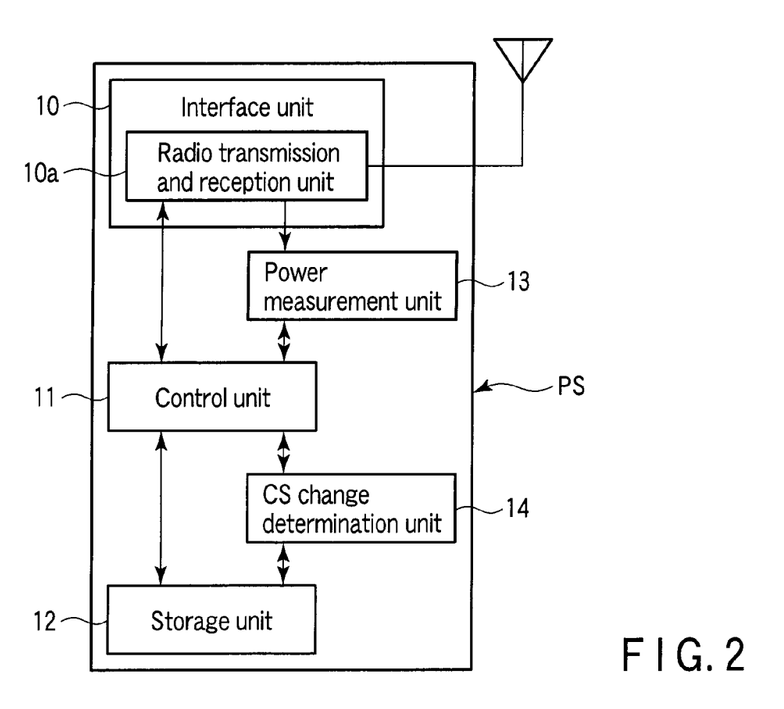
FIG. 2 is an exemplary functional block diagram depicting an embodiment of a mobile terminal PS of FIG. 1.

FIG. 2 shows a functional block diagram depicting an embodiment of the mobile terminal PS of FIG. 1. The mobile terminal PS includes an interface unit 10, a control unit 11, a storage unit 12, a power measurement unit 13, and a CS change determination unit 14. The interface unit 10 includes a radio transmission and reception unit 10a.

The radio transmission and reception unit 10a achieves radio communications with base stations CS. The mobile terminal PS may communicate with the control device 1 through the base station CS. The control unit 11 transmits and receives information to and from the interface unit 10 and the storage unit 12 to control the mobile terminal PS. The storage unit 12 stores information related to a reception power of the radio wave received from the base station CS in addition to various control programs. The power measurement unit 13 measures a reception power of the radio wave received by the transmission and reception unit 10a. The CS change determination unit 14 determines whether or not to perform handoff on the basis of the reception power measured by the power measurement unit 13, and determines a base station CS of a destination base station CS after handoff.

More specifically, the power measurement unit 13 measures a reception power of a radio wave from a current station that is the base station before handoff and a reception power of a radio wave from the next station that is the base station after handoff for each handoff. The transmission and reception unit 10a reports the result of the measurement to the control device 1 for each handoff.

Figure 3:
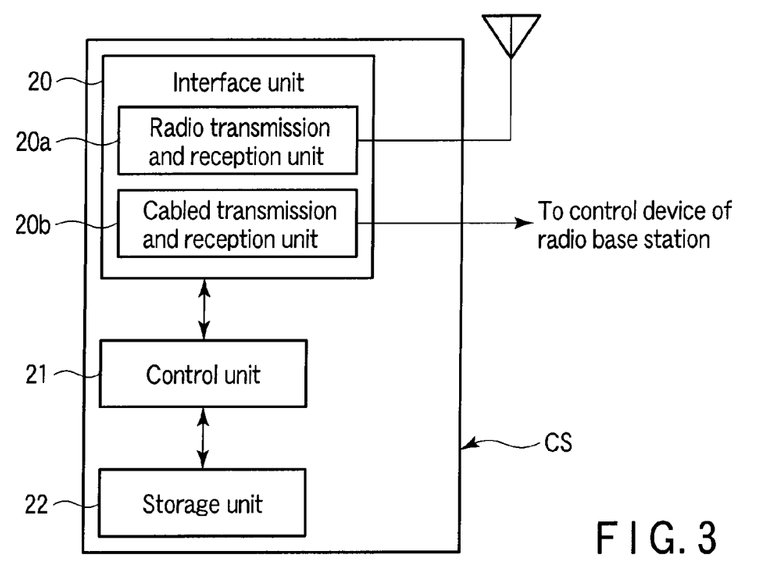
FIG. 3 is an exemplary functional block diagram depicting an embodiment of a base station CS of FIG. 1.

FIG. 3 shows a functional block diagram depicting an embodiment of the base station of FIG. 1. The base station is provided with an interface unit 20, a control unit 21, and a storage unit 22. The interface unit 20 includes a radio transmission and reception unit 20a and a cabled transmission and reception unit 20b.

The radio transmission and radio reception unit 20a achieves radio communications with the mobile terminal PS. The cabled transmission and reception unit 20b communicates with the control device 1 via a cable line. Especially, the cabled transmission and reception unit 20b reports an output power, which is the radiation intensity of a radio wave radiated so that its own station (a base station CS) forms a radio zone with the control device 1. The control unit 21 transmits and receives the information to and from the interface unit 20 and the storage unit 22 to control the base station CS itself.

Figure 4:
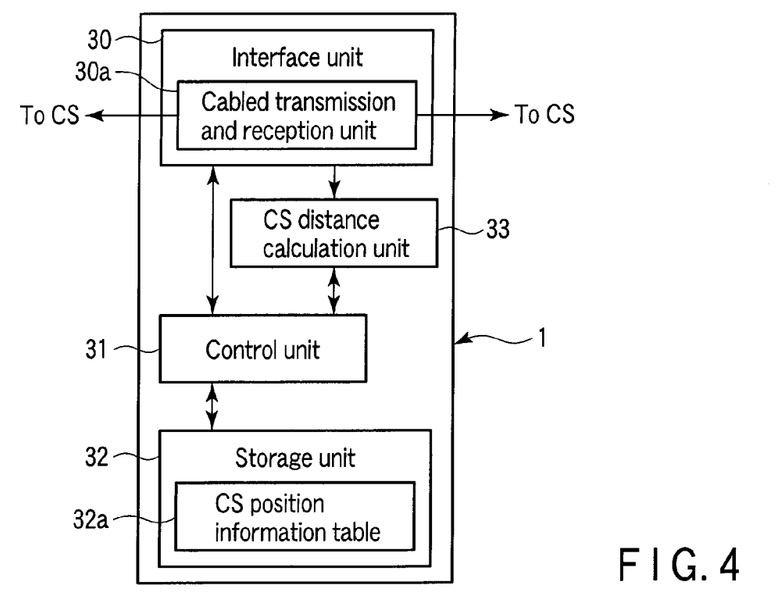
FIG. 4 is an exemplary functional block diagram depicting a first embodiment of a control device 1 of FIG. 1.

FIG. 4 shows a functional block diagram depicting an embodiment of the control device 1 of FIG. 1. The control unit 1 comprises an interface unit 30, a control unit 31, a storage unit 32, and a CS distance calculation unit 33. The interface unit 30 includes a cabled transmission and reception unit 30a in order to communicate with the base station CS. More specifically, the cabled transmission and reception unit 30a receives a reception power of a radio wave from the current station and a reception power of a radio wave from the next station reported for each handoff of the mobile terminal PS. Further, the storage unit 32 stores a CS position information table 32a. The table 32a is updated by the control unit 31. The update includes writing new information and rewriting information which has already been stored.

The CS distance calculation unit 33 calculates a distance between the base station CS and the mobile terminal PS on the basis of the output power from the base station CS and values (reception powers from the current and the next station) reported from the mobile terminal PS through the base station CS. That is, the calculation unit 33 calculates a first distance and a second distance. The first distance is the distance between the current station and the mobile terminal PS at a time of handoff; it may be calculated from the difference between an original output power of the current station and the reception power at the position of the mobile terminal PS. The second distance is the distance between the next station and the mobile terminal PS at a time of handoff; it may be calculated from the difference between an original output power of the next station and the reception power at the position of the mobile terminal PS.

The CS position information table 32a is a database in which distance data between adjacent base stations CSs stored in a database form. The distance data is not limited to real values, but calculated values of distances. The table 32a includes an adjacent relationship showing which base station CS is adjacent to which of other base stations, and also the output power notified from each station CS.

Figure 5:
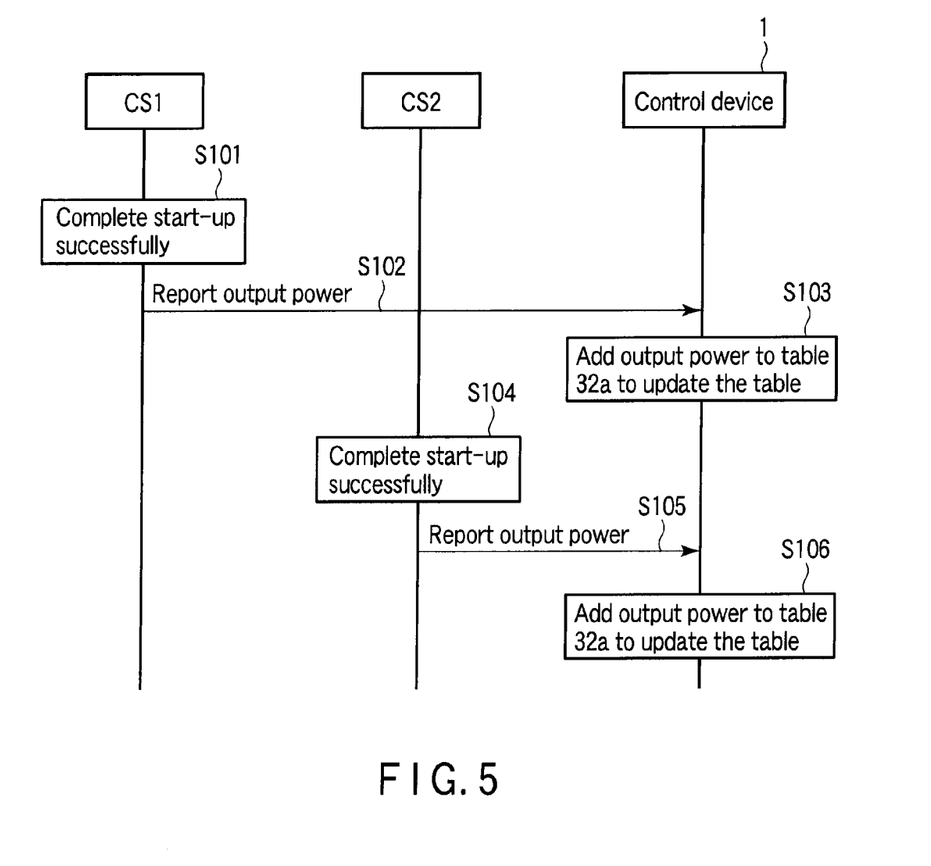
FIG. 5 is an exemplary sequence view depicting a processing procedure executed among base stations CSs right after installation and the control device 1.

FIG. 5 shows a sequence view depicting an example of a processing procedure to be performed between a base station CS right after installation and the control device 1. When the start-up of the base station CS1 through power on after installation has completed successfully (Step S101), the base station CS1 notifies the output power, i.e., its own radio wave radiation power (power value), to the control device 1 (Step S102). The control device 1 which has notified the output power associates the notified output power with the base station CS1 to update the information table 32a (Step S103).

In the same way, when the base station CS2 has started successfully through the power on after installation (Step S104), the base station CS2 notifies its own output power to the control device 1 (Step S105). The control device 1 which has received the notified output power associates the notified output power with base station CS2 to update the information table 32a (Step S106).

Figure 6:
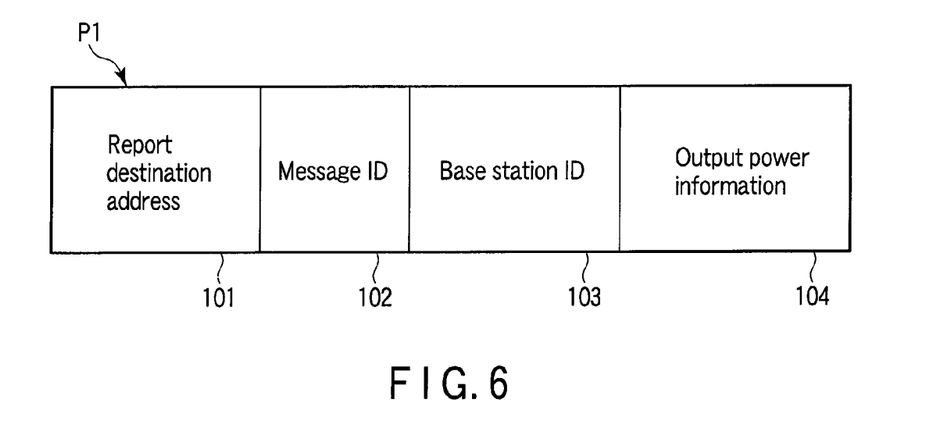
FIG. 6 is an exemplary view depicting an example of a structure of a packet P1 send to the control device 1 from the base stations CSs in the sequence of FIG. 5.

FIG. 6 shows a view depicting an example of a structure of a packet P1 for use in notification of the output power to the control device 1 from the base station CS. The packet P1 has fields in which a report destination address 101, message identification (ID) 102, a base station ID 103, and output power information 104 are described, respectively.

In the field of the address 101, for example, a media access control (MAC) address of the control device 1 that is a destination of a message, or an IP address are described. The message ID 102 indicates that the packet P1 means the start-up of the base station CS. In the field of the base station ID 103, the base station ID of the report origin (the base station CS1 in Step S102 of FIG. 5) is written. In the field of the output power information 104, the output power from the base station CS is written.

Figure 7:
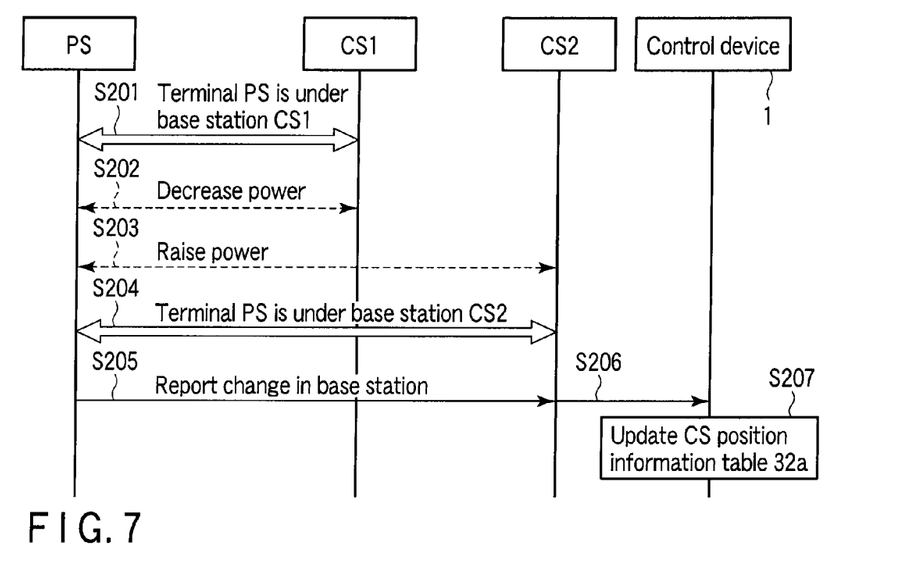
FIG. 7 is an exemplary sequence view depicting a handoff procedure of the mobile terminal PS.

FIG. 7 shows a sequence view depicting a handoff procedure of the mobile terminal PS in the embodiment. In FIG. 7, it is assumed that the mobile terminal PS placed between the base station CS1 and the base station CS2 performs handoff from the base station CS1, which is the current station, to the base station CS2, which is the next station. When the mobile terminal PS moves from a state where the mobile terminal PS is present in a zone of the base station CS1 (Step S201), the reception power from the base station CS1 deteriorates (Step S202).

When the mobile terminal PS moves near the base station CS2, the reception power from the base station CS2 rises (Step S203). If the reception power from the base station CS2 becomes higher than that from the base station CS1, the mobile terminal PS switches the connection destination base station to the base station CS2 (Step S204). While the handoff has been completed in this manner, at this moment, the mobile terminal PS reports a message including a base station change report to the control device 1 through the base station CS2 (Steps S205, S206).

Figure 8:
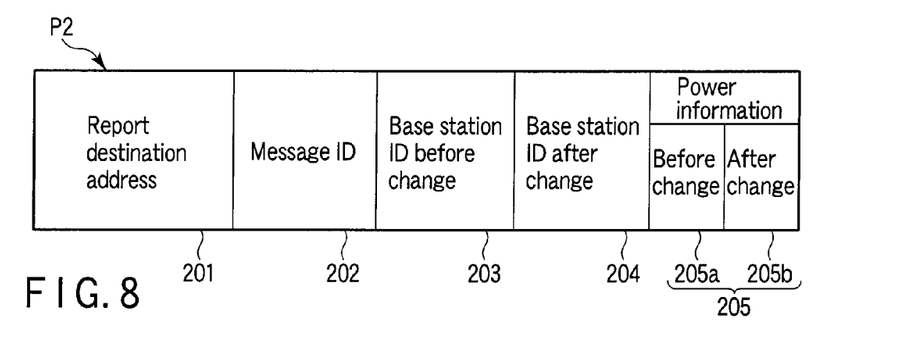
FIG. 8 is an exemplary view depicting an example of a structure of a packet P2 send to the control device 1 from the mobile terminal PS in the sequence of FIG. 7.

FIG. 8 shows a view depicting an example of a structure of a packet P2 reported to the control device 1 from the mobile terminal PS in the sequence of FIG. 7. The packet P2 includes fields in order to describe a report destination address 201, a message ID 202, a base station ID before change 203, a base station ID after change 204, and power information 205, respectively.

The MAC address or the IP address of the control device 1 that is the report destination is written in the field of the report destination address 201. Information indicating that the message having the message ID 202 means the completion of the handoff is written in the field of the message ID 202. Information indicating the base station (current station) before the handoff is the base station CS1 is written in the field of the base station ID before change 203. Information indicating the base station (next station) after the handoff is the base station CS2 is written in the field of the base station ID after change 204.

The field of power information 205 is further segmentalized, and includes fields for describing power information 205a before change and power information 205b after change. The power information 205a indicates the reception power from the current station at the time of the handoff. The power information 205b indicates the reception power from the next station at the time of the handoff.

Now returning to FIG. 7, when the packet P2 is transmitted to the control device from the mobile terminal PS, the control device 1 calculates each of the distances between the mobile terminal PS and the base station CS1 and between the mobile terminal PS and the base station CS2 to update the CS position information table 32a (Step S207). That is, the control device 1 calculates the first distance based on the difference between the original output power from the base station CS1 and the power information before change 205a, and calculates the second distance based on the difference between the original output power from the base station CS2 and the power information after change 205b. The output powers from the base stations CS1, CS2 are obtained from the table 32a and the power information 205a, 205b are extracted from the packet P2.

Figure 9:
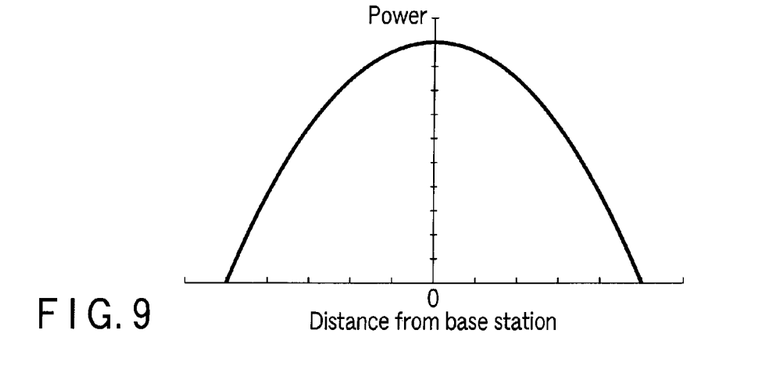
FIG. 9 is an exemplary graph depicting an example of a relationship between a distance from the base station CS and radio wave intensity (power) in a radio zone.

FIG. 9 shows a graph depicting an example of a relationship between a distance from a base station CS and radio wave intensity (power) in a radio zone. The power of the radio wave radiated from the base station CS gradually attenuates with the distance from the base station CS. The relationship between the distance from the base station CS and the power is expressed by various equations. As such an example, when the distance from the base station CS is set to x, the output power from the base station CS is set to max, and the power at a position away by the distance x from the base station CS is set to y, the relationship between them is expressed by the following equation (1). In FIG. 9, the lateral axis x indicates the distance from the base station CS, and the longitudinal axis y indicates the power at the position distance x.

$$x=\sqrt{max-y} \qquad (1)$$

If the output power max from the base station CS and the power y received from the base station CS are obtained, the distance between the base station CS and the mobile terminal PS may be calculated by the equation (1).

Figure 10:
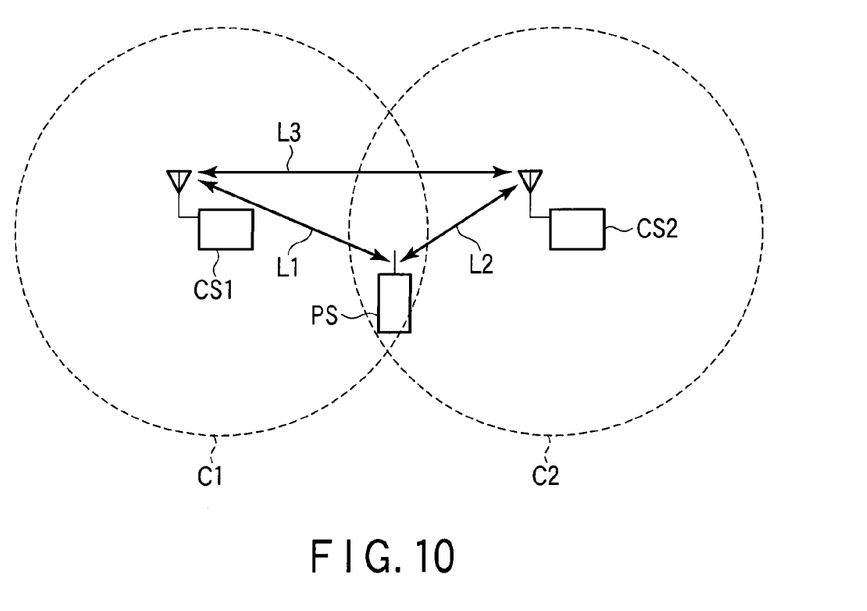
FIG. 10 is an exemplary view depicting an example of a positional relationship between base stations CS1, CS2 before and after a change and the mobile terminal PS.

FIG. 10 shows a view depicting an example of a positional relationship among the base stations CS1, CS2 and the mobile terminal PS. In FIG. 10, the real distance between the base stations CS1 and CS2 is indicated by L3, and in a mobile communication system without base station installation design, its value can only be obtained manually. Therefore, in this embodiment, the mobile communication system calculates the distances L1, L2 from the mobile terminal PS in the handoff position to both the base stations CS1 and CS2 on the basis of the reception power of the radio wave. L1 indicates the distance between the mobile terminal PS and the base station CS1, and L2 indicates the distance between the mobile terminal PS and the base station CS2. C1 indicates the radio zone of the base station CS1, C2 indicates the radio zone of the base station CS2.

While a sum of the distances L1 and L2 is always larger than the distance L3, it is clear that the minimum value of the sum becomes close to the distance L3. Then, updating the table 32a by the minimum value of the sum of the distances L1, L2 enables generating the table 32a, which is close to a real state. If there is a terminal PS on a linear line connecting the base stations CS1, CS2, an equation "L1+L2=L3" is satisfied, and the minimum value of "L1+L2" becomes equal to L3.

Figure 11:
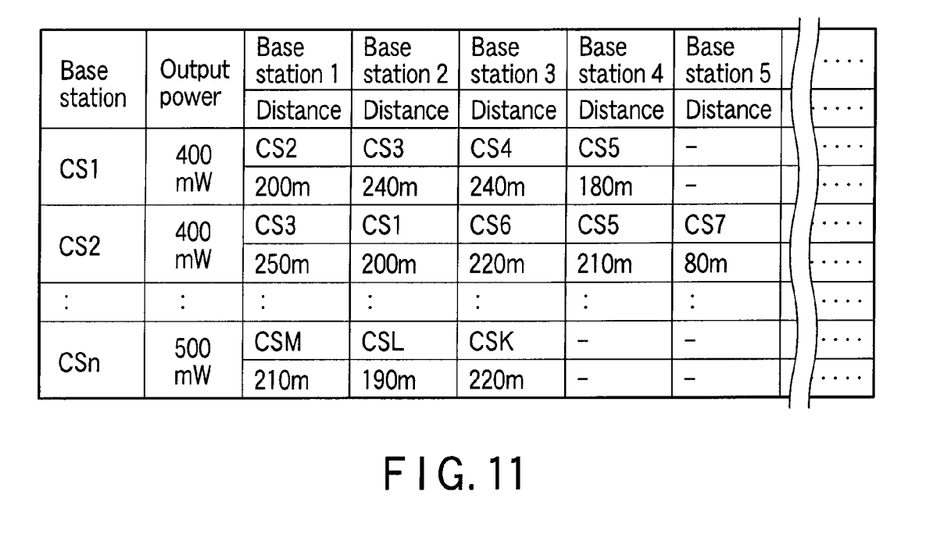
FIG. 11 is an exemplary view depicting an example of a CS position information table 32a of FIG. 4.

FIG. 11 shows an example of the CS position information table 32a of FIG. 4. In FIG. 4, the output power of each of the base stations CS1, CS2, . . . , CSn is indicated as 400 mW, 400 mW, . . . , 500 mW, respectively. The table 32a records the values individually notified from each base station. It is clear that the four base stations adjacent to the base station CS1 are CS2, CS3, CS4 and CS5. Further, in the table 32a, the distances from each adjacent base station CS2, CS3, CS4, CS5 to the base station CS1 are recorded as 200 m, 240 m, 240 m, 180 m, respectively.

Figure 12:
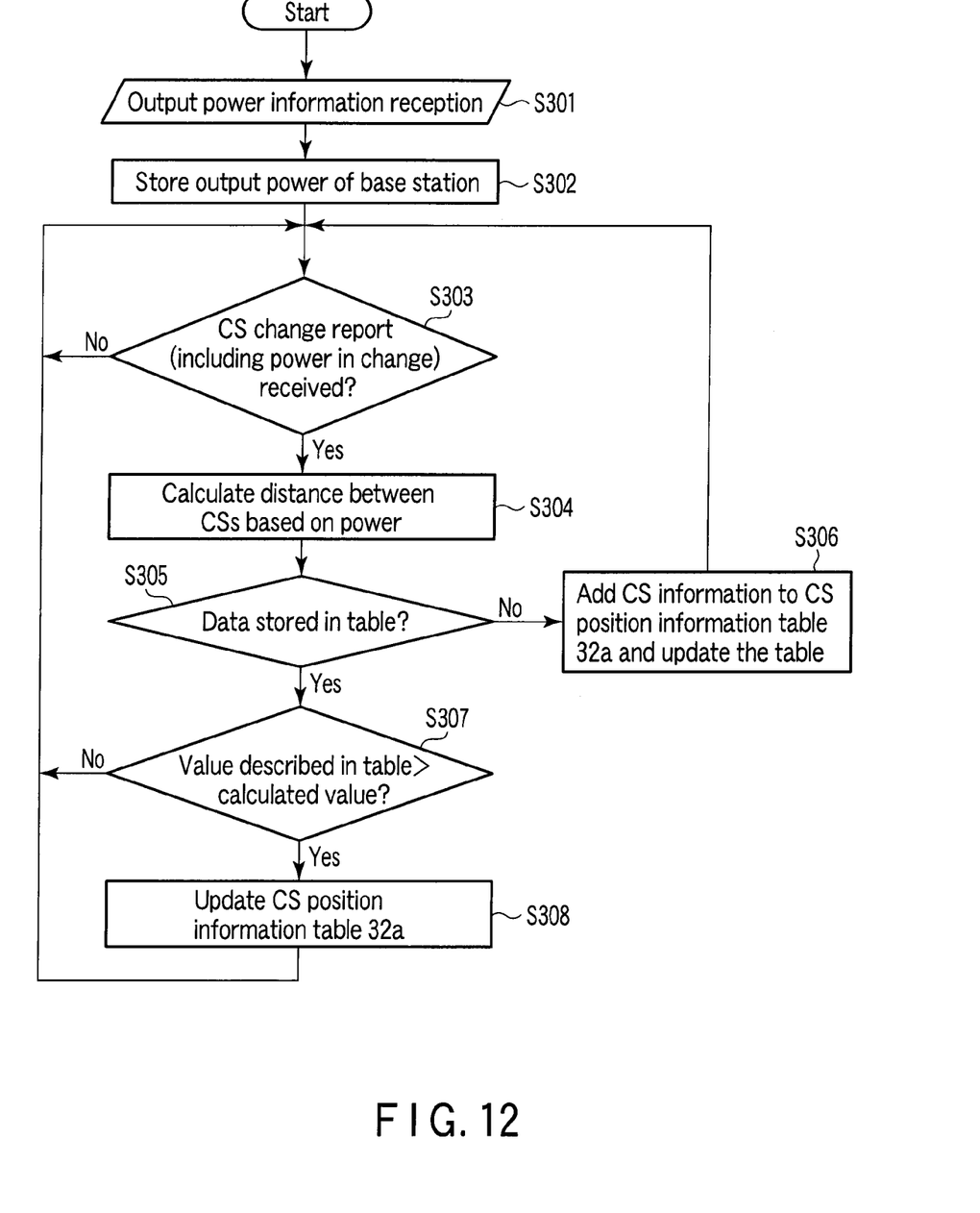
FIG. 12 is an exemplary flowchart depicting a processing procedure of the control device 1 for calculating a linear distance between the base stations CSs.

FIG. 12 shows a flowchart depicting an update processing procedure of the CS position information table 32a. Repeating the procedure of FIG. 12 approximates the distances between the base stations recorded in the table 32a to a linear distance. In FIG. 12, the control device 1 receives the packet P1 including the output power (output power information 104) of the base station CS (Step S301). The control device 1 then refers to the output power information 104 of the packet P1 to write the value of the output power in a column of the output power of the corresponding-base station CS in the table 32a (Step S302).

The control device 1 then determines whether or not the CS change report (packet P2) has been received (Step S303), if the packet P2 has not been received, the control device 1 returns to procedure S303. When receiving the packet P2, the control device 1 refers to the power information before change 205a and the power information after change 205b, and calculates the distances L1 between the mobile terminal PS and the current station CS1, and the distance L2 between the mobile terminal PS and the next station CS2. Further, the control device 1 adds these distances L1, L2 to each other to calculate the distance L3 between the base stations CS1, CS2 (Step S304).

The control device 1 determines whether or not the distance L3 has been recorded in the table 32a (Step S305). If the distance L3 has not been recorded therein, the control device 1 writes the distance L3 at the corresponding-column in the table 32a (Step S306) and returns to the procedure S303.

If the distance between the base stations CS1, CS2 has already been recorded in the table 32a, the control device 1 determines whether or not the calculated value L3 is smaller than the value which has been recorded in the table 32a (Step S307). If the calculated value L3 is smaller than the value which has already been recorded in the table 32a, the control device 1 updates the table 32a by the smaller value L3 (Step S308). After this, the processing procedure returns to Step S303. Conversely if the calculated value L3 is larger than the value which has already been recorded in the table 32a, the control device 1 does not update the table 32a, and returns to the Step S303.

As described above, in the embodiment, for the handoff, the mobile terminal PS reports the reception power from the current station and the reception power from the next station to the control device 1. The control device 1 calculates the distances L1, L2 that are the distances between the mobile terminal PS and the current and the next stations at the time of the handoff on the basis of the original output powers from the current and next stations. The control device 1 compares the sum of the values (L1+L2) with the value recorded in the table 32a, and if the calculated value is smaller, updates the table 32a by the smaller value. Repeating such processing approximates the distance between base stations in the table 32a and reduces the shortest distance, and enables progressively calculating the linear distance between the base stations. In this way, according to the embodiment, even if there is no installation design, the mobile communication system may easily acquire adjacent relationships of a plurality of base stations CSs and distances of inter-base station CS.

In the existing technique, since the mobile communication system has no information for managing the relationship among base stations, for performing the handoff, when the mobile terminal searches for the base station for the switching destination, and if the communication is available, the base station is decided as the destination of the handoff and performs the handoff. However, during high-speed movement of the mobile terminal, the communications in processing of the handoff are frequently interrupted.

Therefore, it is required for the mobile communication system to have a database of information for managing the relationship among base stations, more specifically, of the relationship between adjacent base stations and the distances between base stations, and predict the base stations as the destinations of the handoff by taking the lead on the system side. However, it requires manpower to construct such a database and such work requires a great deal of time.

Meanwhile, according to the embodiment, for performing the handoff, using the information reported from the mobile terminal PS enables automatically constructing a database showing the relationship and distances among base stations. Therefore, the system can recognize the distances and adjacent relationships among base stations on the system side, with a result that the system can improve the handoff performance and high-speed movement performance at a low cost.

The invention is not limited to the configuration of the above. For instance, the unit of the power, which is reported from the base stations CS to the control device 1, is not limited to W or dBm, and any other expression indicating the intensity of a radio wave can be used. In the same way, the output power from the base station CS is not limited to the power indicated by the unit W, or dBm, and any other expression indicating the electric field intensity expressed by V/m or dBV/m, any other expression indicating the radio wave intensity, or any other expression indicating the error rate can be used.

The aforementioned embodiment has been described in a case where the distance data is calculated by using the handoff as a trigger, and then, the CS position information table 32a is updated. While the handoff is established at both times when the mobile terminal is in a calling state and in a standby state, according to a context, the handoff may be used as a word meaning only base station switching in the calling state.

The handoff in limited meaning is not used as triggers for the calculation of the distance data and for the update of the table 32a. In short, with moving mobile terminal among radio zones, the base stations as the connecting destinations are also switched. The processing in this embodiment may be implemented at the base station switching timing. That is, in any of the states of calling, communication and standby, upon switching base stations, the calculation of the distance data and the update of the table 32a can be performed. Thus, the triggers for the update of the table 32a are extremely increased, early construction of the database and acceleration of accuracy improvement can be achieved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile communication system comprising:
a plurality of base stations which individually form radio zones;
a mobile terminal configured to perform handoff as the mobile terminal moves among the radio zones; and
a control device configured to communicate with both the base stations and the mobile terminal, wherein
the mobile terminal comprises:
a report unit configured to report a reception power of a radio wave from a current station that is a base station before the handoff and a reception power of a radio wave from a next station that is a base station after the handoff to the control device for each handoff; and
the control device comprises:
a calculation unit configured to calculate a first distance that is a distance between the current station and the mobile terminal on the basis of a difference between a reported value of the reception power of the radio wave from the current station and an output power of the current station, and to calculate a second distance that is a distance between the next station and the mobile terminal on the basis of a difference between a reported value of the reception power of the radio wave from the next station and an output power of the next station;
a database configured to store distance data between the base stations in a database form; and
an update unit configured to update the distance data by a minimum value of a sum of the first and the second distances.

2. The system according to claim 1, wherein
the base station comprises a notification unit configured to notify the output powers that are radiation intensities of radio waves from the base stations individually forming the radio zones to the control device, and
the database includes the output powers notified from the respective base stations.

3. A control device configured to communicate with both a plurality of base stations which individually form radio zones and a mobile terminal configured to perform handoff as the mobile terminal moves among the radio zones, comprising:
a reception unit configured to receive a reception power of a radio wave from a current station that is a base station before the handoff and a reception power of a radio wave from a next station that is a base station after the handoff, wherein the reception power is reported for each handoff of the mobile terminal;
a calculation unit configured to calculate a first distance that is a distance between a current station and the mobile terminal on the basis of a difference between a reported value of the reception power of the radio wave from the current station and an output power of the current station, and to calculate a second distance that is a distance between the next station and the mobile terminal on the basis of a difference between a reported value of the reception power of the radio wave from the next station and an output power of the next station;
a database configured to store distance data between the base stations in a database form; and
an update unit configured to update the distance data by a minimum value of a sum of the first and the second distances.

4. The device according to claim 3, wherein
the output powers are the radiation intensities of radio waves,
the reception unit receives the output powers notified from the respective base stations, and
the database includes output powers notified from the respective base stations.

5. A mobile terminal configured to perform handoff as the mobile terminal moves among radio zones being individually formed by each of base stations, comprising:
a report unit configured to report a reception power of a radio wave from a current station that is a base station before the handoff and a reception power of a radio wave from a next station that is a base station after the handoff to a control device configured to communicate with the base stations for each handoff,
wherein the control device comprises:
a calculation unit configured to calculate a first distance that is a distance between the current station and the mobile terminal based on a difference between a reported value of the reception power of the radio wave from the current station and an output power of the current station, and to calculate a second distance that is a distance between the next station and the mobile terminal based on a difference between a reported value of the reception power of the radio wave from the next station and an output power of the next station;
a database configured to store distance data between the base stations in a database form; and
an update unit configured to update the distance data by a minimum value of a sum of the first and the second distances.

6. A construction method of a database for use in a mobile communication system which comprises: a plurality of base stations individually forming radio zones, a mobile terminal performing, and a control device configured to communicate with both the base stations and the mobile terminal, the method comprising:
reporting, by the mobile terminal, a reception power of a radio wave from a current station that is a base station before the handoff and a reception power of a radio wave from a next station that is a base station after the handoff, to the control device for each handoff;
calculating, by the control device, a first distance that is a distance between the current station and the mobile terminal on the basis of a difference between a reported value of the reception power of the radio wave from the current station and an output power of the current station;
calculating, by the control device, a second distance that is a distance between the next station and the mobile terminal on the basis of a difference between a reported value of the reception power of the radio wave from the next station and an output power of the next station; and
updating, by the control device, distance data between base stations in a database, which has stored the distance data therein in a database form, by means of a minimum value of a sum of the first and the second distances.

* * * * *